April 7, 1942.  L. T. STOYKE ET AL  2,278,715
VALVE
Filed Oct. 10, 1940
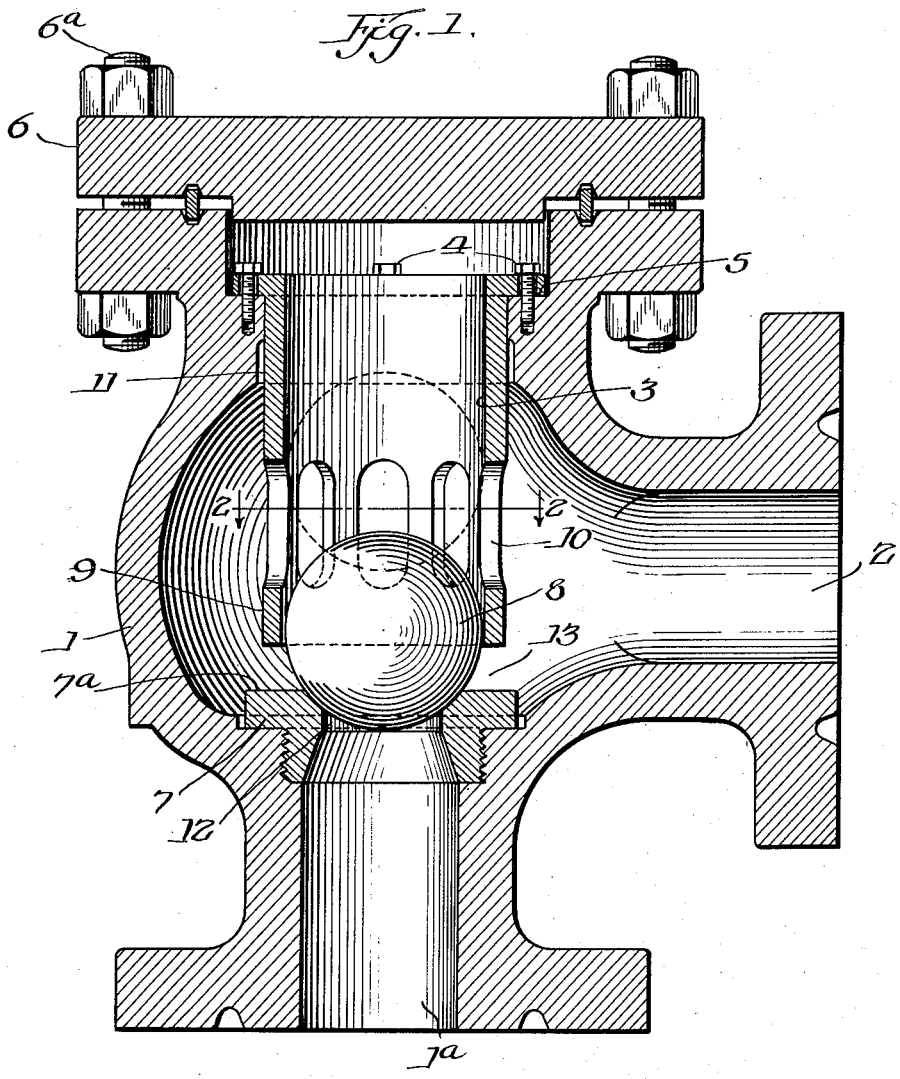
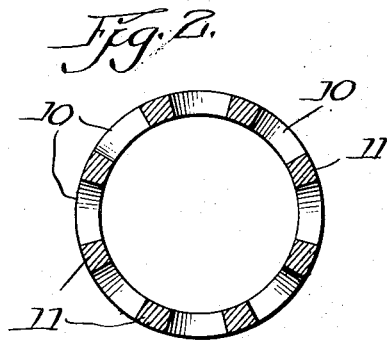
Inventors:-
Frederick R. Venton
Ludwig T. Stoyke:
By: Joseph O. Lange  Atty.

Patented Apr. 7, 1942

2,278,715

UNITED STATES PATENT OFFICE

2,278,715

VALVE

Ludwig T. Stoyke, Chicago, and Frederick R. Venton, Clarendon Hills, Ill., assignors to Crane Co., Chicago, Ill., a corporation of Illinois Application October 10, 1940, Serial No. 360,538

5 Claims. (Cl. 251—121)

This invention relates to check valves preferably of the ball type and more particularly to the combination of a novel sleeve construction wherein the ball is so mounted and guided as to increase the maximum flow of fluid therethrough.

At the outset, in order to obtain an appreciation of the applicants' novel contribution to the art, it should be understood that in order to lift the usual spherical closure member in a ball check valve from its seat it is necessary initially to obtain a higher pressure below the ball than above. Further, in order to continue to maintain the ball member in a lifted or open position, this pressure differential must be substantially maintained. In explanation, a high velocity, low pressure region is created between the ball and the valve seat at the instant that the ball is lifted from its seat and the line fluid has begun to flow therethrough. The line fluid flows around and above the ball where it loses velocity and regains pressure (in accordance with Bernoulli's theorem) and forces the ball into the low pressure area referred to onto the valve seat where it remains momentarily and until static pressure builds up sufficiently beneath the ball to cause it to be lifted again from the valve seat. Close observation of these phenomena has shown that this cycle of movement of the valve closure member is repeated many times per second, and together with the turbulent forces set up thereby the ball is caused to oscillate in a variety of directions, leading to ultimate pounding respectively against the valve seat, the top limit, and the sides of the valve casing.

It has long been thought by those skilled in the art that the use of a sleeve guide for the closure member would avoid or at least correct substantially the described objectionable action occurring in ball check valves. Repeated studies and actual tests have shown that the solution is not to be found in this arrangement. To the applicants' knowledge, no one previously has ever analyzed the problem from the standpoint of producing a ball-guiding means which is relatively simple but highly efficient in the performance of its function.

Accordingly, the present invention has for its principal object the provision of a novel ball retaining means or apertured sleeve guide which is so positioned with relation to the valve seat and ball and so proportioned with relation to the ball and to the valve seat that the ball is guided reciprocably and smoothly to and from its seat without the objectionable pounding of chattering previously referred to when a stream of fluid is flowing through the valve.

Another important object of our invention lies in the provision of a ball-guiding sleeve which provides that a pressure differential is created between the top and bottom of the ball, whereby the ball is thus lifted a substantial distance from the valve seat even at relatively low rates of flow. It has been found that this increased lift reduces the friction losses and the resultant pressure drop in the valve, in addition to eliminating the pounding and chattering of the ball closure member which is largely attributable to uncontrolled turbulent forces within the valve casing.

Other objects and advantages of our present invention will become more apparent upon proceeding with the following detailed description which is to be considered in connection with the drawing, and in which Fig. 1 is a vertical sectional view of an angle valve embodying one form of our invention.

Fig. 2 is a view taken on the line 2—2 of Fig. 1.

Like reference numerals refer to like parts in the respective views of the drawing.

At the outset, it should be explained that we have chosen to illustrate and to describe our invention as it may be applied to an angle type of ball check valve but it will also become apparent, as the description proceeds, that the invention is equally applicable to the type of device known in the art as the horizontal or globe type of ball check valve.

Referring to Fig. 1, the numeral 1 generally designates the casing having the inlet portion 1a and the outlet portion 2 of the valve which we have chosen to illustrate the preferred embodiment of our invention. Flanged means for connecting the valve to a fluid pipe line are shown, but obviously other connecting means, as for example screw threads, may be provided for that purpose, if desired.

The guide sleeve, generally designated 3, is fixedly mounted within the valve casing by a number of bolt studs 4 which are screwed into threaded openings provided in the annular shoulder 5 beneath the bonnet closure member or cap 6, the latter being attached to the casing 1 by the bolts 6a. It should be apparent that the guide sleeve 3 might be provided with other means for its positioning within the casing, such as making it integral with the valve seat 7, or otherwise being attached to it.

For purpose of clearer description of our inventive contribution, the guide sleeve 3 may be said to be composed essentially of three portions. The lower restricting portion 9 is a continuous annular section which surrounds the ball 8 at the maximum periphery of the latter member and serves to restrict the normal line flow which continues past the ball upwardly into the sleeve chamber above the ball, the dotted lines showing the position of the ball in the open or lifted position. The middle portion 10 of the sleeve is a discontinuous annular section, suitably apertured peripherally in order to allow for the escape of fluid from the sleeve into the outlet 2. We have discovered that the restricted area between the ball and the lower sleeve portion thus cooperates with the large apertures in the middle of the sleeve portion so as to limit the flow of fluid within the sleeve and to provide unrestrained escape means from the sleeve for that fractional portion of the main flow passing through the restricted area. Thus it is our further determination that a pressure differential is created between the top and bottom of the ball, causing the ball closure member to be lifted and maintained in such position away from its seat. The upper attaching portion 11, as indicated, is a continuous annular section and serves to position the guide sleeve by means of bolt studs 4 as already explained. As stated, the guide sleeve might have other means for positioning it within the casing such as making it integral with the valve seat by ribbed means, or otherwise. In the case of such a substantial equivalent, it is apparent that the upper attaching portion 11 could be dispensed with and since, as will be explained later, there is no upper limit to the size of the apertures in the portion 10, it can be dispensed with. Also, the portion 9 immediately surrounding the ball, when seated, can be fastened other than as shown, since it is apparent that the detailed manner of attachment is not significant to the invention.

However, as an essential ingredient of our invention, experiments have shown that the valve will operate most satisfactorily when the guide sleeve is designed with certain proportions dependent on the valve seat opening. These ratios are:

(a) The sum of the apertured areas in the portion 10 may be determined by the expression—"greater than 2A"
where A=the area of the opening 12 through the valve seat 7.

(b) The clearance area between the ball 8, and the restricting portion 9 may be expressed as—"less than A/15"

(c) For passage of the main flow of fluid, the lower sleeve portion 9 and the valve seat 7 should have therebetween a radially extending fluid passageway 13 having a cross-sectional area expressed as—"less than 0.875A"

(d) The axial length of the lower portion 9 of the guide sleeve determines the height to which the ball will lift on reasonable rates of flow. This axial length is determined by the expression—

$$\frac{L-D}{2}$$

where L=the desired lift of the ball, which may depend on service for which the valve is to be used
and D=distance between seat face 7a and lower portion 9 of sleeve 3 and (e) The lower edge of the restricting portion 9 should overlap and substantially surround the horizontal centerline of the ball closure member when seated.

Thus it should be apparent that by the use of a unique construction together with a certain predetermined selection of dimensional proportions, we have accomplished unexpectedly novel performance and efficiency in a conventional type of valve which heretofore has not been obtained.

It will be apparent, however, that the invention is not limited to the specific construction illustrated or to the specific arrangement of parts shown and described but may be modified within the invention as defined by the appended claims.

We claim:

1. A check valve comprising a casing having an inlet and an outlet, a seat within the casing and a ball closure member therefor, annular ball-guiding means, the said annular ball-guiding means and the said seat having therebetween a radially extending passageway for fluid having a cross-sectional area less than 87½% of the area of the opening through said seat, said ball-guiding means consisting of a substantially continuous annular member overlapping and substantially surrounding the horizontal centerline of the said ball when seated, the ball and said ball-guiding means having therebetween an area less than one-fifteenth of the area of the opening through said seat.

2. A ball check valve comprising a casing having an inlet and an outlet, a seat within the casing, a ball closure member for said seat, a sleeve guide for said ball closure member supported in a predetermined position above the seat and in axial alignment therewith, the said sleeved guide and the said seat having therebetween one or more radially extending fluid passageways having a total cross-sectional area less than 87½% of the area of the opening through said seat, said sleeved guide comprising a continuous annular member overlapping and surrounding the horizontal centerline of the ball when seated, the annular area between the horizontal centerline of the ball and the said sleeved guide being less than one-fifteenth of the area of the opening through said seat, the continuous angular member of the sleeved guide having an axial length approximately one-half the difference between the distance desired for the ball to lift and the distance from the seat face to the sleeved guide.

3. A check valve comprising a casing having an inlet and an outlet, a seat within the casing, a ball closure member for the said seat, cylindrical guiding means for the said ball closure member positioned above and aligned axially with said seat, the said guiding means and said ball closure member having radially extending fluid passageways therebetween having a combined area of not more than 87½% of the area of the opening through the said seat, the said guiding means having a lower portion comprising a continuous circular section, said lower portion having a lower edge overlapping the horizontal centerline of the said ball closure member when seated, the ball at its horizontal centerline and the said lower portion of the guiding means having therebetween an area less than one-fifteenth of the area of the opening through the said seat, the said guiding means having a middle portion comprising an apertured circular section, the combined area of said apertures being not less than twice the area of the opening through said seat, the said guiding means having an upper portion comprising a substantially continuous circular section having means for positioning the said guiding means within the casing.

4. A check valve comprising a casing having an inlet and an outlet, a seat within the casing and a ball closure member therefor, sleeve-formed apertured means snugly surrounding a substantial portion of the ball closure member, the said apertured means and the said seat having therebetween a radially extending passageway for fluid having a cross-sectional area less than 87½% of the area of the opening through said seat, said apertured means consisting of a substantially continuous annular member overlapping and substantially surrounding the horizontal centerline of the said ball when seated, the ball and said apertured means having therebetween an area less than one-fifteenth of the area of the opening through said seat, the said sleeve having its apertures radially extending just above the point of substantial tangency of the ball with the inner periphery of the sleeve-formed means, whereby the width of the sleeve below the apertured portions controls the lift of the said ball closure member.

5. A ball check valve comprising a casing having an inlet and an outlet, a ball closure member for said casing, a guide sleeve for said ball closure member suspended above the seat and in axial alignment therewith, the said sleeve having a lower edge terminating at such a distance above the seat that the continuation to the seat of the inside sleeve wall would have a cylindrical area less than 87½% of the area of the opening through said seat, said guide sleeve having a lower portion consisting of a continuous annular section, said lower portion having a lower edge overlapping the horizontal centerline of the ball when the latter member is seated, the portion of the ball at the said horizontal centerline and the said lower portion of the guide sleeve having therebetween an area less than one-fifteenth of the area of the opening through said seat, the said guide sleeve having a middle portion comprising an annular section with openings therethrough, the combined area of said openings being at least twice the area of the opening through the said seat, the said guide sleeve having an upper portion comprising an annular section with attaching means at the upper edge thereof, the said latter means cooperating with an upper portion of the casing to predeterminately position the said guide sleeve with relation to the said valve seat, the guide sleeve lower portion having an axial length approximately one-half the difference between the distance desired for the ball to lift and the distance from the seat face to the guide sleeve.

LUDWIG T. STOYKE.
FREDERICK R. VENTON.